United States Patent [19]

Schindele

[11] Patent Number: 4,498,693
[45] Date of Patent: Feb. 12, 1985

[54] RAIL SYSTEM WITH PASSAGEWAYS FOR THE CONDUCTION OF FLUID FLOW

[76] Inventor: Ernst F. Schindele, 505 W. Hill Rd., Stamford, Conn. 06905

[21] Appl. No.: 468,081

[22] Filed: Feb. 22, 1983

[51] Int. Cl.³ .............................................. F16L 39/00
[52] U.S. Cl. ................................. 285/137 R; 285/61; 248/222.1
[58] Field of Search ................... 285/137 R, DIG. 15, 285/64, 61; 248/222.1, 222.2, 222.3

[56] References Cited

U.S. PATENT DOCUMENTS

| | | | |
|---|---|---|---|
| 2,645,783 | 7/1953 | Allen | 285/137 R X |
| 3,879,068 | 4/1975 | Stampfli | 285/137 R |
| 4,080,752 | 3/1978 | Burge | 285/137 R X |
| 4,082,324 | 4/1978 | Obrecht | 285/137 R |

Primary Examiner—Richard J. Scanlan, Jr.
Attorney, Agent, or Firm—Parmelee, Bollinger & Bramblett

[57] ABSTRACT

A rail system is provided having a rail with one or more passageways extending therein, which passageways are adapted to provide a conduit for fluid flow therethrough, for example, air, oxygen and vacuum, which are particularly useful in emergency rooms and operating rooms of hospitals in order to provide ready access at convenient locations to the fluid flow available in the rail system. The rail may be removably mounted by plates mounted every six to eight feet along a wall which are attached to inner grooves extending along the top and bottom surfaces of the rail near the edges of the upper and lower corners. Likewise, other equipment useful for emergency or operating room procedures may be attached by clamps in aligned outer grooves along the same rail carrying the fluid flow. Couplings are provided to the passageways in the rail system which extend to the external sources of fluid flow conducted by the passageways in the rail and access is provided to the passageways in the rail at convenient locations along the rail to make the fluid flow conduction in the rail convenient for the user.

6 Claims, 4 Drawing Figures

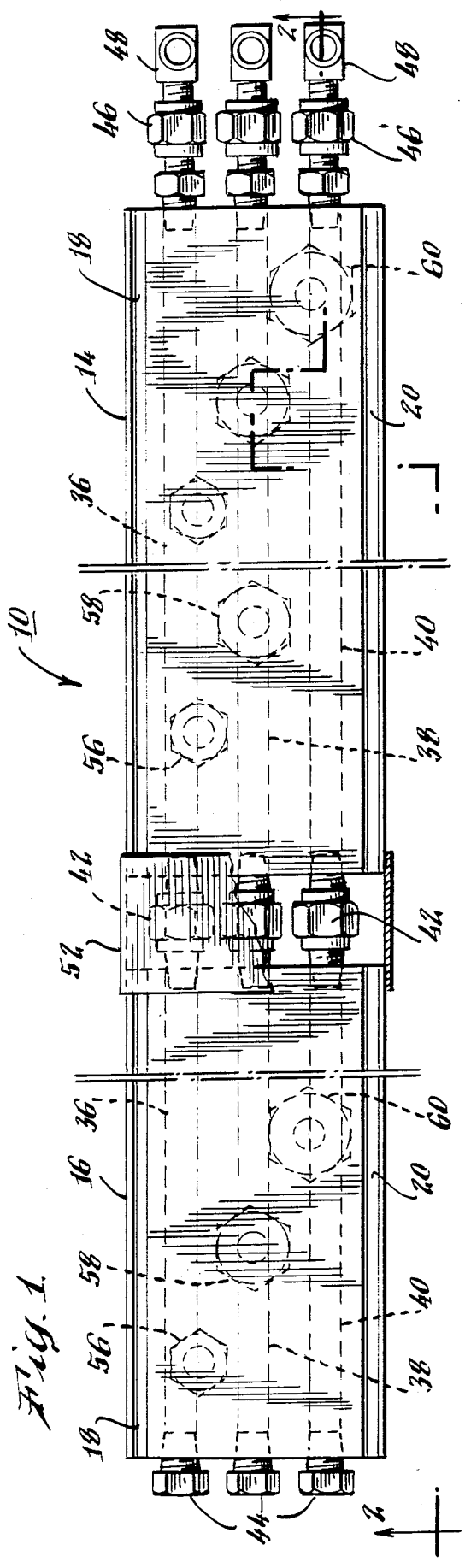
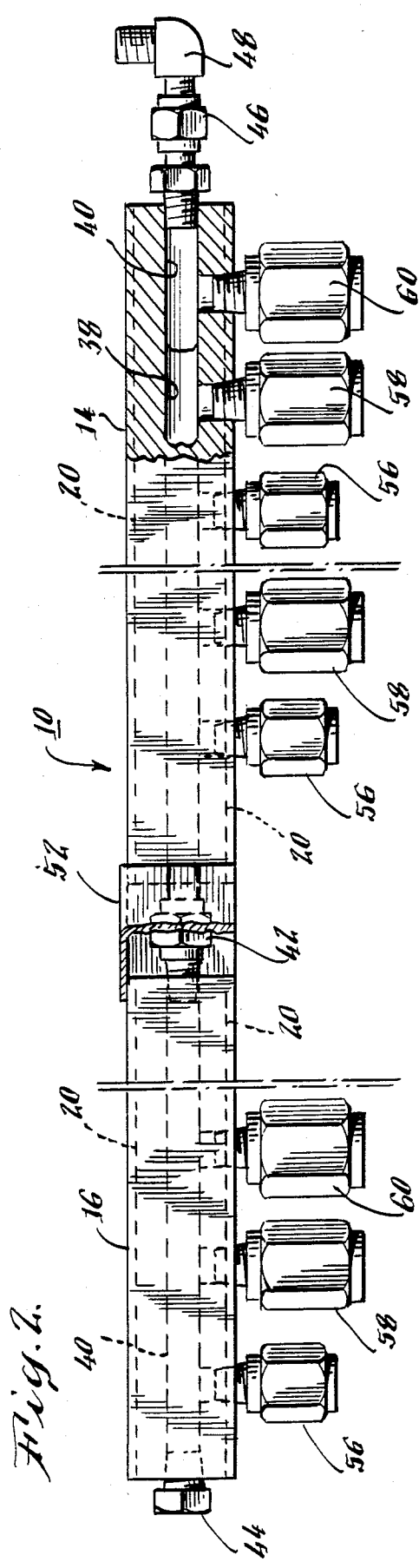

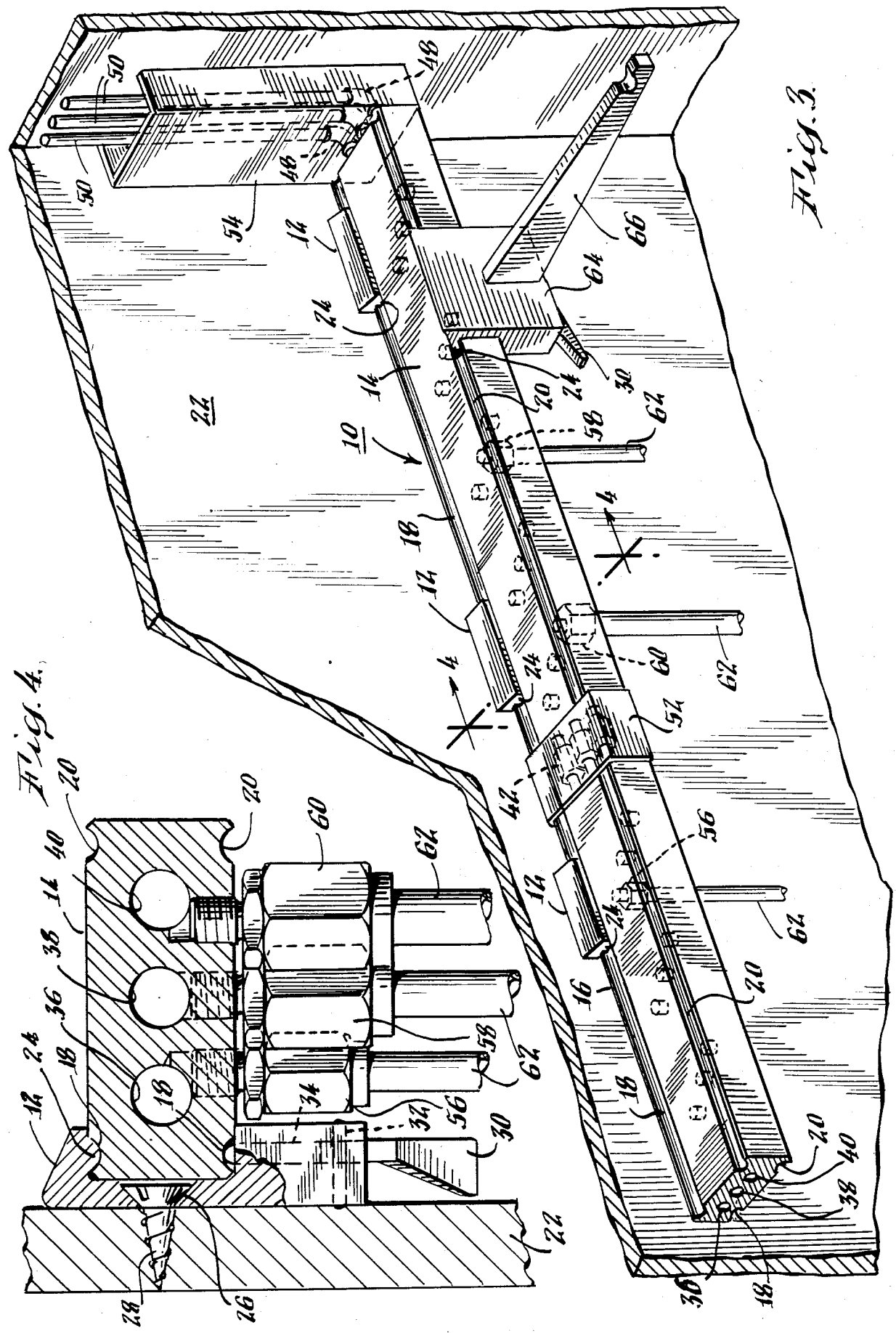

RAIL SYSTEM WITH PASSAGEWAYS FOR THE CONDUCTION OF FLUID FLOW

BACKGROUND OF THE INVENTION

This invention relates to a rail system, and more particularly to a rail system having one or more passageways extending therein for the conduction of fluid flow therein to provide ready access at convenient locations to the fluid flow which is particularly useful in hospital environments where fluid flow such as oxygen, air and vacuum are required at various times for medical purposes.

Medical facilities such as doctor's examination rooms, hospital emergency rooms, operating rooms etc. are characterized with a plethora of medical equipment, apparatus, devices and various outlets for supplying access to fluid flow such as: air, oxygen or a vacuum. The latter types of fluid flow are usually provided by individual outlets thereby providing limited access. The problem is in planning the provision for such outlets in the rooms involved, and, of course, the ever changing nature of medical equipment may require modification of the installations to accommodate upgraded or new medical diagnostic equipment and apparatus. The result is that if a room is not planned properly, the outlets, for example, furnishing a fluid flow in the form of a vacuum may not be properly placed thereby requiring long lengths of hoses which may get in the way of the people performing the operations or the examinations. It certainly is not feasible to change the piping or conduit system in the walls or ceilings whenever a change or rearrangement of the medical facilities are made in order to accommodate new or improved medical equipment and/or procedures.

Providing a sufficient number of fluid flow outlets spaced around a particular room may prove prohibitively expensive in piping, and further provides no assurance that the outlets will still be placed in the most convenient location as unforseeable changes may occur in the use and rearrangement of the equipment in the room.

SUMMARY

It is an object of this invention to provide a new and improved rail system which accommodates the conduction of fluid flow therein to provide ready access at convenient locations to such fluid flow.

Another object of this invention is to provide a new and improved rail system for providing fluid flow which system is readily removably attached so that it is truly a changeable, variable system which does not require massive structural changes in a building to accommodate changes in providing fluid flow outlets.

Still another object of this invention is to provide a new and improved rail system which is flexible, relatively inexpensive when compared to permanent type installations, is functional and provides a modular, attractive type of installation.

Still another object of this invention is to provide a new and improved rail system which not only accommodates convenient fluid flow access but also provides a mounting structure for other medical equipment.

In carrying out this invention in one illustrative embodiment thereof, a rail system is provided having one or more passageways extending therein adapted to provide a conduit for fluid flow therethrough. The rail has aligned outer and inner grooves extending along the top and bottom surfaces thereof near the edges of the upper and lower corners for accommodating removably mounting the rail onto a wall using the inner grooves while accommodating the mounting of equipment on the rail using the outer grooves. Coupling means are provided for coupling the passageway in the rail to external sources of fluid flow of the type conducted by the passageways in the rail, for example, air, oxygen, vacuum etc. and access means are coupled to the passageways in the rail for providing convenient access to the fluid flow conduction paths of the passageways in the rail.

The fluid flow rails provided in the present invention may be readily mounted and removed from walls, interconnected in standard sizes to cover desired lengths, and may have convenient covering panels which provide ready access to the couplings to and between the rails and yet provide a cover for unsightly coupling to present a neat, modular appearance for the system. The rails may be extruded in standard lengths and intercoupled as well as tapped using standard fittings.

BRIEF DESCRIPTION OF THE DRAWINGS

The invention, together with further objects, aspects, features and advantages thereof will be more clearly understood from the following description taken in conjunction with the accompanying drawings in which like elements bear the same reference numerals throughout.

FIG. 1 is a top plan view of the rail system embodying the present invention.

FIG. 2 is a side elevation of FIG. 1.

FIG. 3 is a perspective view of one form of the rail system embodying the present invention illustrating access connections, wall mountings and illustrating the manner in which external equipment may be mounted on the same rail system.

FIG. 4 is a cross-sectional view taken along lines 4—4 of FIG. 3.

DESCRIPTION OF THE PREFERRED EMBODIMENTS

Referring first to FIG. 3, a rail system, referred to generally with the reference numeral 10, may include a plurality of rails 14 and 16 mounted by mounting plates 12 on a wall 22. The rails 14 and 16 have aligned inner grooves 18 extending along the top and bottom surfaces of the rails near the edges of the upper and lower corners for accommodating removably mounting the rails on the mounting plates 12. As is clearly illustrated in FIG. 4, the mounting plates 12 have a rounded ridge 24 extending downwardly therefrom which is adapted to fit in the upper inner groove 18 of the rails 14 and 16. The mounting plates may have a plurality of holes 26 therein for accommodating and mounting the plate 12 by screws 28 onto the wall 22.

The lower end of the mounting plate 12 includes an identical pair of levers 30 which are pivotally mounted by pins 32 to the mounting plate 12 and operate movable rods 34 which when the levers 30 are pivoted to their actuated position as shown in FIG. 4, push the rods 34 into the lower inner grooves 18 of the rails 14 and 16. Accordingly, when the rods 34 are in their unactuated position a rail may be inserted in the mounting plate 12 with the inner upper groove 18 positioned under and in contact with the rounded ridge 24 on the upper portion of the mounting plate 12 and the inner side of the rail positioned flush up against the back of the plate 12. Accordingly, when the levers 30 are actuated, the rods 34 are moved into the lower inner grooves 18 of the rails thereby locking the rail in position on the mounting plate. The number of mounting plates required will depend on the length of the rails 14 and 16, as well as the load carried and would be normally positioned approximately every six feet.

As is illustrated in FIGS. 1, 2 and 4, the rails 14 and 16 contain a plurality of passageways 36, 38 and 40, which are adapted to accommodate fluid flow therethrough, such for example, as the conduction of air, oxygen, or vacuum etc. The passageways 36, 38 and 40, may be provided by extrusion techniques with the rails being extruded to the length desired. After extrusion the passageways 36, 38 and 40, may then be threaded on the ends thereof to accommodate suitable unions, fittings, plugs or other plumbing and/or coupling devices.

As is illustrated in FIGS. 1, 2 and 3, a plurality of rails such as 14 and 16 may be joined by the unions 42 thereby providing a rail system with passageways therethrough that may extend and cover large areas utilizing standard rail sizes. As will be seen at FIGS. 1 and 2, plugs 44 may be used to close the passageways on the unconnected ends thereon. On the ends opposite the plugs, standard fittings 46 may be coupled to the passageways 36, 38 and 40, and coupled via the fittings and elbows 48 to pipings 50 which feed the source of fluid flow to their respective passageways.

The unions 42 which intercouple the two rails 14 and 16 may be provided with a protective and decorative cover 52 which may be plastic and U-shaped which simply fits on and clips over the interconnected rails 14 and 16 for providing a neat appearance. Likewise, a frictional cover 54, illustrated in FIG. 3, may be clipped over the pipings 50 as well as fittings and couplings 48 covering the pipes and fittings which would otherwise be exposed to present a neat, modular appearance to the rail system.

It will be apparent that the pipings and fittings used to connect the various sources of fluid flow into the rail system may be located at various points and locations in the room and the flexibility of the rail system permits the rails to be coupled to these sources without tearing up walls. Suitable pipings and fittings may be run from the sources wherever they are located in the room to one end of the rail containing the passageway and simply coupled thereto. Although several sources of fluid flow are mentioned namely, oxygen, air and a vacuum, the types of sources are not limited to these particular sources but are mentioned simply because they are often used and required in hospital and emergency environments. It will be apparent however, that other types of fluid flow may be accommodated in the passageways, if required.

Convenient access may be had to the fluid flow passageways 36, 38 and 40, by fittings 56, 58 and 60, which tap into the passageways. The fittings 56, 58 and 60, have a diameter index safety system (DISS) so that the various sources cannot be mixed up. The fittings 56, 58 and 60, all will have check valves which close automatically when hoses 62 as shown in FIG. 3, are attached thereto for making the source available, for example, at emergency or operating tables located somewhere in the room in which the rail is run. The access fittings 56, 58 and 60, may be located at various points along the length of the rail to provide convenient access. The locations for fittings 56, 58 and 60, can be plugged if that location is not in use. It should be noted that the holes in which the fittings 56 and 60, are threaded are set off-center to provide suitable and convenient spacing for the different size fittings in accordance with the DISS arrangement. It should be pointed out that if desired, the outlets provided by the fittings 56, 58 and 60, may be reversed as the rails 14 and 16 are symmetrical. Since the rails are removably mounted in the plates 12, the reversal would merely require clamping the outer grooves 20 in the mounting plates 12.

As will be seen in FIG. 3, a mounting clamp 64 carrying a hanger arm 66 may be positioned and clamped in the outer grooves 20 of the rails 14 and 16, so that medical equipment may be positioned, retained and/or stored thereon. A variety of different mounting clamps which carry shelves, containers, hangers, and other types of clamps may be utilized for the storing or otherwise mounting a variety of medical equipment on the rail system. The rail system thus performs the dual functions of accommodating both fluid flow as well as permitting the mounting and storing of medical equipment on the rail system. When medical equipment is not in use, it may be conveniently positioned on the rail in a position which is out of the way. This is particularly necessary in operating and emergency rooms where a large variety of equipment is stored to be available for use when needed. Since all forms of emergency treatment do not require the same equipment, it is often necessary to keep that which is not in use out of the way, but available when it is necessary.

The removability and flexible mounting of the arrangement of the rail system embodying the present invention is useful in hospital settings because if the fluid flow conduits in the rail system or the rails themselves become contaminated, the rail system may be dismantled and sterilized. This would be difficult if not impossible if the sources are structurally incorporated in walled outlets.

The rail system of the present invention provides an extremely flexible system which is in modular form and can accommodate mounting and utilization in a variety of room sizes and locations. In fact, the entire system may be dismantled and used elsewhere or can be conveniently remounted changing the particular access to the fluid flow outlets desired. The fluid flow rail system in accordance with the present invention may be extruded in standard lengths, intercoupled and may utilize standard fittings for intercoupling the rails as well as making external source connections to the sources of fluid flow. The rail system is not exclusively restricted to the use of a conduit for fluid flows but may also be utilized for the dual purpose of removably positioning other equipment on the system.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A rail system for providing conduction of fluid flow with ready access at a convenient location to said fluid flow comprising:
   a rail having two or more passageways extending therein adapted to provide a conduit for at least two different types of fluid flow therethrough, said passageways having coupling threads on the ends thereof for accommodating coupling fluid flow to said passageways and for providing a means for intercoupling one rail to another, mounting means for removably mounting said rail on a surface, means on said rail for accommodating removably mounting said rail onto a wall and accommodating the mounting of equipment on said rail, coupling means connected to said coupling threads on one end of said rail for coupling said passageways in said rail to at least two different types of external sources of fluid flow to be conducted by said passageways in said rail, and access means coupled to said passageways in said rail for providing convenient access to the fluid flow conduction paths provided by said passageways in said rail.

2. A rail system for providing conduction of fluid flow with ready access at a convenient location to said fluid flow comprising:

a rail having one or more passageways extending therein adapted to provide a conduit for fluid flow therethrough, said passageways are threaded on the ends thereof to accommodate the intercoupling of two or more rails thereby increasing the length of accessability of said fluid flow, mounting means for removably mounting said rail on a surface, aligned outer and inner grooves extending along the top and bottom surfaces of said rail near the edges of the upper and lower corners thereof for accommodating removably mounting said rail onto a wall using the inner grooves while accommodating the mounting of equipment on said rail using said outer grooves, coupling means for coupling said passageways in said rail to external sources of fluid flow of the type to be conducted by said passageways in said rail, and access means coupled to said passageways in said rail for providing convenient access to the fluid flow conduction paths provided by said passageways in said rail.

3. A rail system for providing conduction of fluid flow with ready access at a convenient location to said fluid flow comprising:

a rail having one or more passageways extending therein adapted to provide a conduit for fluid flow therethrough, mounting means for removably mounting said rail on a surface, aligned outer and inner grooves extending along the top and bottom surfaces of said rail near the edges of the upper and lower corners thereof for accommodating removably mounting said rail onto a wall using the inner grooves while accommodating the mounting of equipment on said rail using said outer grooves, coupling means for coupling said passageways in said rail to external sources of fluid flow of the type to be conducted by said passageways in said rail, said passageways are threaded on both ends thereof and one end is coupled by said coupling means to the sources of fluid flow which are desired in said passageways, and access means coupled to said passageways in said rail for providing convenient access to the fluid flow conduction paths provided by said passageways in said rail.

4. A rail system for providing conduction of fluid flow with ready access at a convenient location to said fluid flow comprising:

a rail having one or more passageways extending therein adapted to provide a conduit for fluid flow therethrough, mounting means for removably mounting said rail on a surface, aligned outer and inner grooves extending along the top and bottom surfaces of said rail near the edges of the upper and lower corners thereof for accommodating removably mounting said rail onto a wall using the inner grooves while accommodating the mounting of equipment on said rail using said outer grooves, coupling means for coupling said passageways in said rail to external sources of fluid flow of the type to be conducted by said passageways in said rail, access means coupled to said passageways in said rail for providing convenient access to the fluid flow conduction paths provided by said passageways in said rail, and said access means is arranged on a diagonal with respect to the width of said rail and have a different external diameter thereby presenting different sizes to the user to prevent the inadvertent connection to the wrong fluid passageway.

5. A rail system for providing conduction of fluid flow with ready access at a convenient location to said fluid flow comprising:

a rail having one or more passageways extending therein adapted to provide a conduit for fluid flow therethrough, mounting means for removably mounting said rail on a surface, aligned outer and inner grooves extending along the top and bottom surfaces of said rail near the edges of the upper and lower corners thereof for accommodating removably mounting said rail onto a wall using the inner grooves while accommodating the mounting of equipment on said rail using said outer grooves, coupling means for coupling said passageways in said rail to external sources of fluid flow of the type to be conducted by said passageways in said rail, a U-shaped cover for covering said coupling means and the piping to said fluid sources for presenting a modular rail system and covering unappealing intercouplings and piping, and access means coupled to said passageways in said rail for providing convenient access to the fluid flow conduction paths provided by said passageways in said rail.

6. A rail system for providing conduction of fluid flow with ready access at a convenient location to said fluid flow comprising:

a rail having one or more passageways extending therein adapted to provide a conduit for fluid flow therethrough, mounting means for removably mounting said rail on a surface, said mounting means comprises a plate with holes within adapted to accommodate mounting screws, a channel therein formed between an upper ridge and a lower shelf, said lower shelf including a plurality of movable rods operated by actuating levers mounted for pivotal movement in said mounting means,
aligned outer and inner grooves extending along the top and bottom surfaces of said rail near the edges of the upper and lower corners thereof for accommodating removably mounting said rail onto a wall using the inner grooves while accommodating the mounting of equipment on said rail using said outer grooves,
said plate receiving said rail in said channel with said upper ridge fitting into said inner grooves on said rail, said rail being held therein on the actuation of said levers which move said rods into the lower inner groove of said rail thereby locking said rail in said plate,
coupling means for coupling said passageways in said rail to external sources of fluid flow of the type to be conducted by said passageways in said rail,
and access means coupled to said passageways in said rail for providing convenient access to the fluid flow conduction paths provided by said passageways in said rail.

* * * * *